(12) United States Patent
Woo et al.

(10) Patent No.: US 9,444,348 B2
(45) Date of Patent: Sep. 13, 2016

(54) ELECTRONIC APPARATUS AND POWER CONTROLLING METHOD THEREOF

(71) Applicant: SAMSUNG ELECTRONICS CO., LTD., Suwon-si, Gyeonggi-do (KR)

(72) Inventors: Won-myung Woo, Seoul (KR); Jin-hyung Lee, Anyang (KR)

(73) Assignee: SAMSUNG ELECTRONICS CO., LTD, Suwon-Si (KR)

( * ) Notice: Subject to any disclaimer, the term of this patent is extended or adjusted under 35 U.S.C. 154(b) by 278 days.

(21) Appl. No.: 13/886,632

(22) Filed: May 3, 2013

(65) Prior Publication Data

US 2014/0056033 A1 Feb. 27, 2014

(30) Foreign Application Priority Data

Aug. 23, 2012 (KR) .................. 10-2012-0092641

(51) Int. Cl.
  *H02M 3/335* (2006.01)
  *H02M 1/00* (2006.01)

(52) U.S. Cl.
  CPC ......... *H02M 3/33507* (2013.01); *H02M 3/335* (2013.01); *H02M 3/33523* (2013.01); *H02M 2001/0032* (2013.01)

(58) Field of Classification Search
  CPC .............. H02M 2001/0032; H02M 3/33507; H02M 3/33523
  USPC ................ 323/349; 363/21.12, 21.13, 21.14, 363/21.15, 21.16, 21.17, 21.18
  See application file for complete search history.

(56) References Cited

U.S. PATENT DOCUMENTS

| | | | | |
|---|---|---|---|---|
| 7,423,856 B2* | 9/2008 | Matyas | ............. | H02M 3/33507 361/90 |
| 2003/0117813 A1* | 6/2003 | Hong | ................ | H02M 3/33507 363/16 |
| 2011/0267024 A1* | 11/2011 | Halberstadt | ........... | H02M 3/156 323/304 |
| 2011/0298281 A1* | 12/2011 | So | ..................... | H02M 3/33507 307/31 |
| 2012/0194131 A1* | 8/2012 | Osswald | ........... | H02M 3/33523 320/112 |
| 2014/0099139 A1* | 4/2014 | Kojima | ............. | H02M 3/33515 399/88 |
| 2014/0232205 A1* | 8/2014 | Li | .......................... | H02J 9/005 307/125 |

FOREIGN PATENT DOCUMENTS

| | | |
|---|---|---|
| KR | 10-2006-0108149 | 10/2006 |
| KR | 10-2006-0121939 | 11/2006 |
| KR | 10-2007012010 | 12/2007 |

* cited by examiner

Primary Examiner — Jue Zhang
Assistant Examiner — Lakaisha Jackson
(74) Attorney, Agent, or Firm — Staas & Halsey LLP

(57) ABSTRACT

An electronic apparatus and a power controlling method thereof are provided. The electronic apparatus includes a system unit supplied with power to conduct an operation, and a power supply unit including a power control unit controlling output of standby power, and supplying the standby power to the system unit. The power control unit includes a pulse width modulation (PWM) generation unit generating a PWM signal and a first switching unit switched on/off based on an external input signal to selectively supply power to the PWM generation unit. Thus, power consumption of the electronic apparatus in the standby mode is minimized to facilitate conformance with power regulations in accordance with an energy saving policy.

20 Claims, 4 Drawing Sheets

ELECTRONIC APPARATUS AND POWER CONTROLLING METHOD THEREOF

CROSS-REFERENCE TO RELATED APPLICATIONS

This application is related to, and claims priority to, Korean Patent Application No. 10-2012-0092641, filed on Aug. 23, 2012 in the Korean Intellectual Property Office, the disclosure of which is incorporated herein by reference.

BACKGROUND

1. Field

Embodiments of the present disclosure relate to an electronic apparatus and a power controlling method thereof, more particularly to an electronic apparatus controlling standby power consumption thereof and a power controlling method thereof.

2. Description of the Related Art

An electronic apparatus including a display device, such as a TV, includes a power supply unit to supply power needed for operation. The electronic apparatus may include a plurality of power modes and may enter a sleep mode (hereinafter, also referred to as standby mode), during which power supply to some components may be suspended, so as to reduce power consumption, after a predetermined time since the electronic apparatus is not operating.

Even when the electronic apparatus is in the standby mode, standby power may need to be supplied to a system unit to conduct minimum operations. Thus, the electronic apparatus may include a standby alternating current (AC)/direct current (DC) converter circuit as a standby power supply unit to generate standby power.

FIG. 1 illustrates a configuration of a conventional standby power supply unit. As illustrated in FIG. 1, the standby power supply unit may be configured as a standby AC/DC converter circuit 10.

Referring to FIG. 1, the standby AC/DC converter circuit 10 operation includes AC power being applied to the circuit 10. The AC power passes through a bridge rectifier circuit 11, and a pulse width modulation (PWM) integrated circuit (IC) 12 and generate a PWM signal. A high-voltage (HV) startup of the PWM IC 12 starts a switch operation of a switching element:70, and VCC voltage is applied to enable the PWM IC 12 to operate properly, thus outputting standby power DC Pulse voltage generated in the PWM IC 12 is switched by the switching element 70, which is then transmitted to a secondary terminal based on a transformation ratio of a transformer 14 and output as DC voltage to a system unit (not shown) operating an electronic apparatus via a rectifier 71 and an electrolytic capacitor 72. The output DC voltage is fed back into a feedback terminal 73 of the PWM IC 12 and regulated by feedback control of the PWM IC 12.

However, a conventional standby AC/DC converter 10, as illustrated in FIG. 1. operates all the time, even during the standby mode of the electronic apparatus, resulting in power loss. Further, loss of power converted from a first circuit to a second circuit of the AC/DC converter 10 occurs regardless of a load. That is, a standby AC/DC conversion operation causes continuous loss in the standby mode, leading to increase in standby power.

Methods of changing operation times and cycle of the switching element 70 by controlling output of the PWM IC by output feedback voltage in the standby mode may be used to attempt to reduce standby power. However, these methods have limitations in reducing the voltage consumed by the standby AC/DC converter 10 alone. Thus, improved apparatus and methods are needed, for example, to meet Zero-Watt technology in accordance with standby power consumption regulations for energy saving.

SUMMARY

Additional aspects and/or advantages will be set forth in part in the description which follows and, in part, will be apparent from the description, or may be learned by practice of the invention.

An aspect of an exemplary embodiment of the present invention is to provide an electronic apparatus including a system unit supplied with power to conduct an operation, and a power supply unit including a power control unit controlling output of standby power, and supplying the standby power to the system unit, wherein the power control unit includes a pulse width modulation (PWM) generation unit generating a PWM signal and a first switching unit switched on/off based on an external input signal to selectively supply power to the PWM generation unit.

The power supply unit may include a first capacitor charged with preset voltage, and the first switching unit may detect the external input signal using the voltage charged in the first capacitor.

The power control unit may include a current source outputting preset current to the first capacitor.

The external input signal may be supplied from the system unit or an external device.

The external input signal may be input in accordance with a state of supply of the standby power to the system unit.

The power supply unit may include a second switching unit receiving the output power from the power control unit to operate.

The power supply unit may include a conversion unit outputting the output power from the second switching unit to a secondary terminal based on a preset transformation ratio.

The power supply unit may include an output unit outputting direct current (DC) power to the system unit by rectifying and filtering the power from the secondary terminal of the conversion unit.

The power supply unit may include a feedback unit feeding back the DC power from the output unit to a feedback terminal of the power control unit.

The foregoing and/or other aspects may be achieved by providing a power controlling method of an electronic apparatus including a system unit supplied with power to conduct an operation and a power supply unit supplying standby power to the system unit, the method including monitoring an external input signal using a first switching unit provided in a power control unit controlling output of the standby power, and waking-up the power control unit by switching the first switching unit on when an on signal input, for example, from outside the unit, is detected as a result of the monitoring.

The waking-up may include supplying power to a pulse width modulation (PWM) generation unit provided in the power control unit.

The power control unit may include a current source outputting preset current to a first capacitor of the power supply unit, and the monitoring may detect the external input signal using voltage charged in the first capacitor.

The external input signal may be supplied from the system unit or an external device.

The external input signal may be input in accordance with a state of supply of the standby power to the system unit.

The method may include receiving the output power from the power control unit and switching the output power by a second switching unit.

The method may include outputting the output power from the second switching unit to a secondary terminal of a conversion unit having a preset transformation ratio.

The method may include outputting direct current (DC) power to the system unit by rectifying and filtering the power from the secondary terminal of the conversion unit.

The method may include feeding back the DC power unit to a feedback terminal of the power control unit.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION

Exemplary embodiments are disclosed in detail with reference to accompanying drawings.

Figure 1:
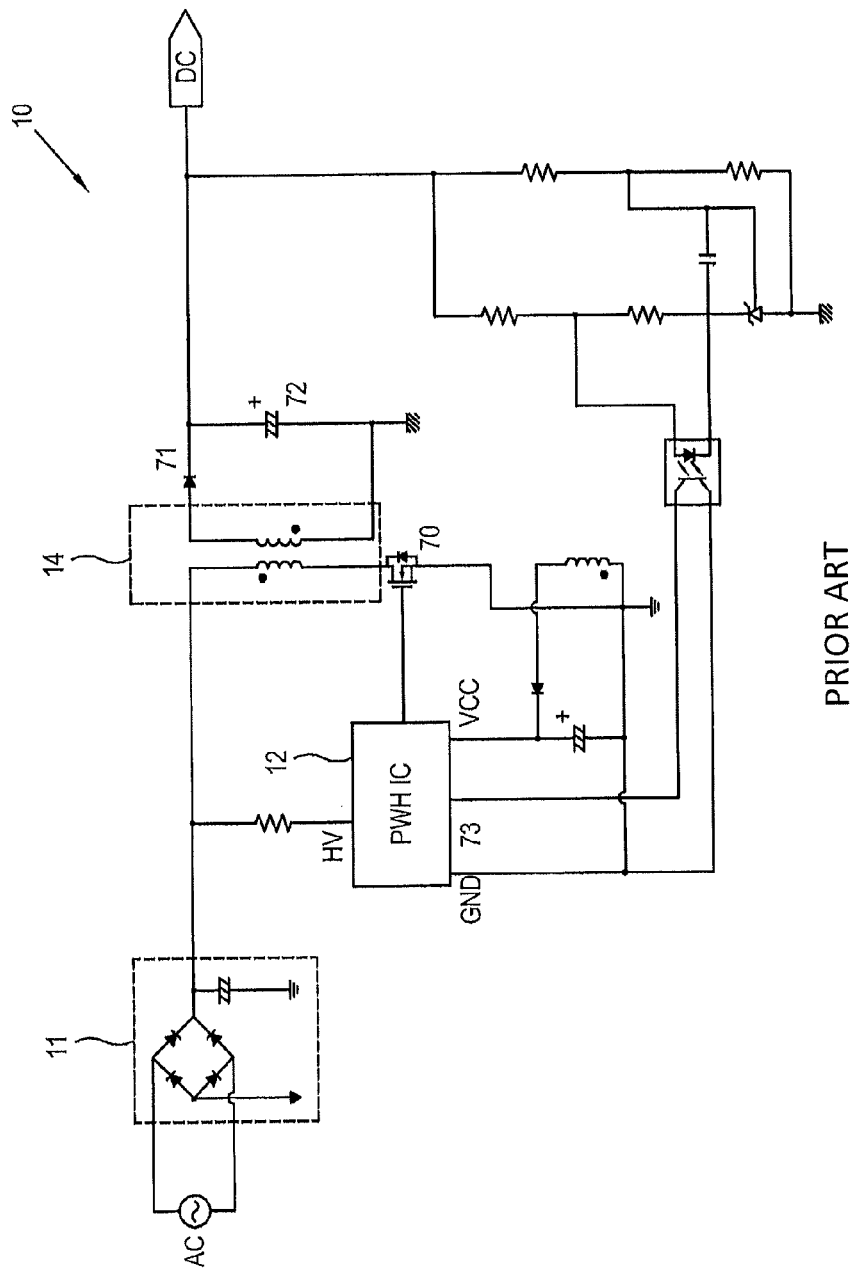
FIG. 1 illustrates a conventional standby power supply unit.
Figure 2:
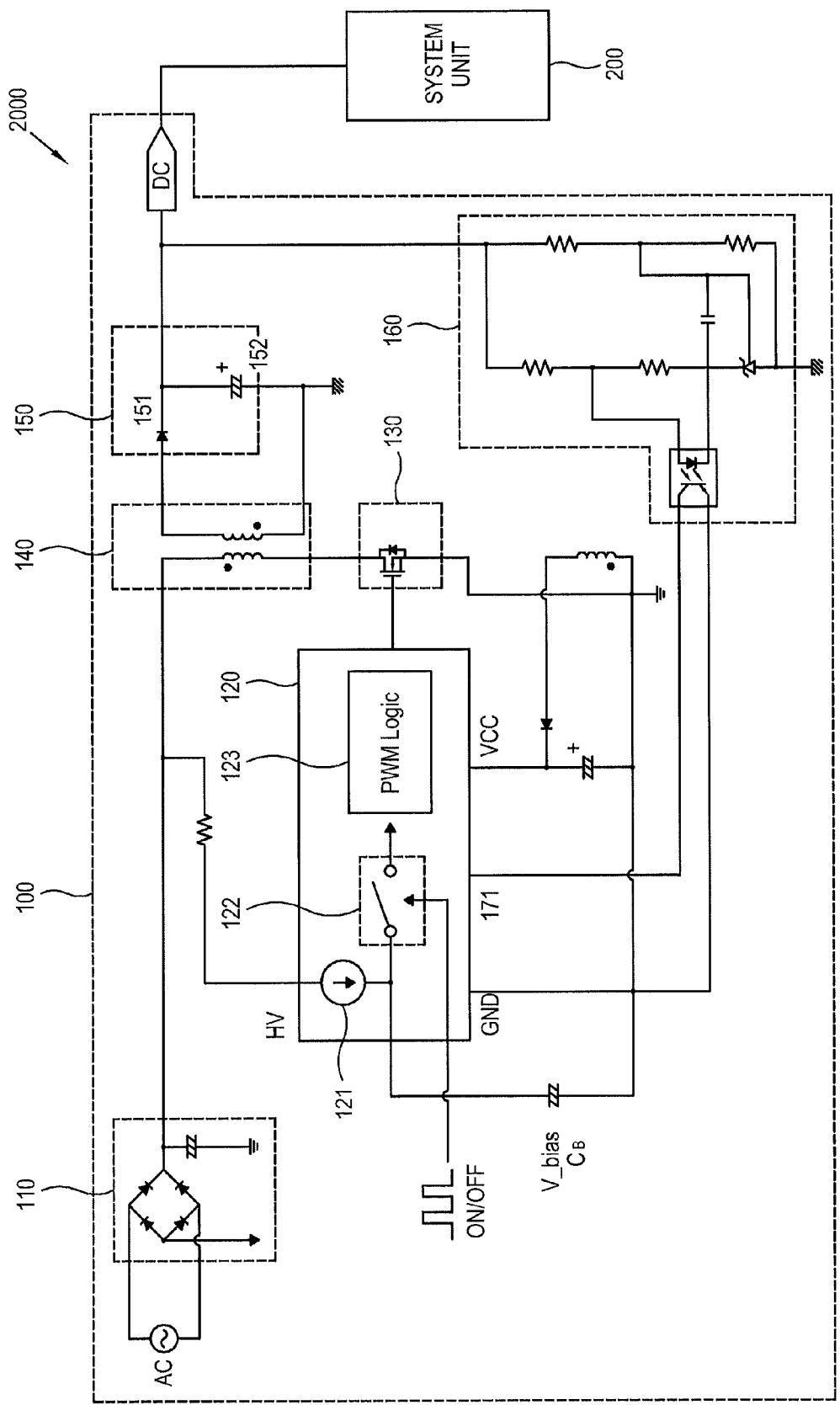
FIG. 2 illustrates an electronic apparatus according to an exemplary embodiment.
Figure 3:
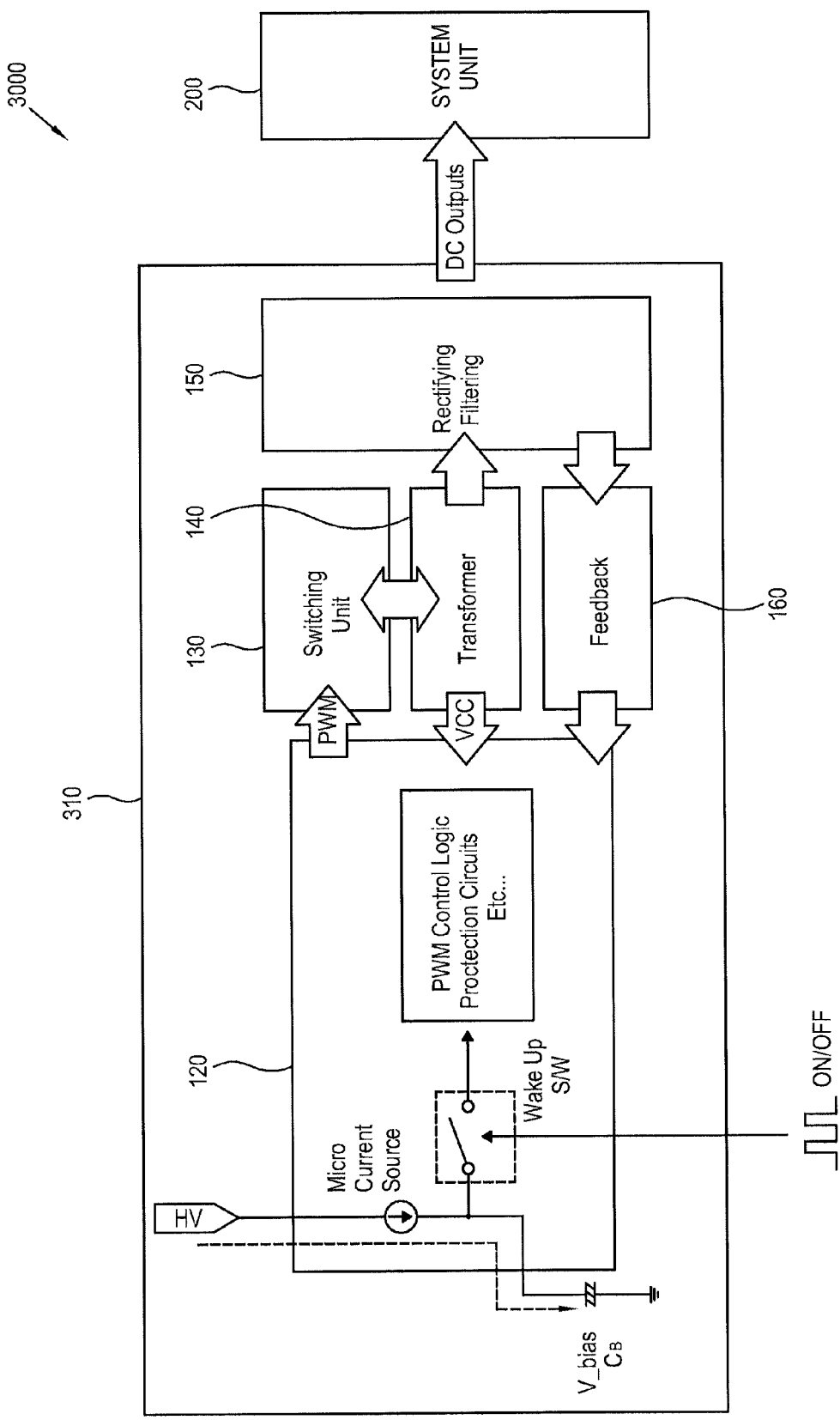
FIG. 3 illustrates an exemplary operation of a power supply unit.

FIG. 2 illustrates a configuration of an electronic apparatus 2000 according to an exemplary embodiment, and FIG. 3 illustrates an exemplary operation of a power supply unit 100 of FIG. 2.

The electronic apparatus 2000 may be configured as a display apparatus, such as a TV and a monitor, portable terminal equipment, such as an MP3 player and a mobile phone, and a computer, such as a desktop computer and a laptop computer. As illustrated in FIG. 2, the electronic apparatus 2000 may include a power supply unit 100 supplying standby power to a system unit 200 and the system unit 200 performing an operation.

The system unit 200 performs an operation of the electronic apparatus 2000. For example, when the electronic apparatus 2000 is a display apparatus, the system unit 200 may process an image signal provided from an external image source according to a preset image processing process to display an image and include an image processing unit to process an image signal, a display unit to display an image based on an image signal, a communication unit communicating with the outside, a storage unit to store various types of data, and a controller (CPU) to control the display apparatus.

The system unit 200 includes a plurality of power modes. The electronic apparatus 2000 may enter a standby mode, in which power supply to some components is suspended after a predetermined time since the system unit 200 is not performing an operation.

For example, the display apparatus may communicate with a remote controller to receive a user instruction or supply power to the communication unit that detects external input, such as a USB, after entering the standby mode. When the controller of the display apparatus detects external input through the communication unit, the system unit 200 may be leave the standby mode and switch from a power mode to a normal mode.

The power supply unit 100 may perform as a power supply device for supplying power to the system unit 200. An exemplary power supply unit 100 t may be a system wake-up circuit configured as a standby alternating current/direct current (AC/DC) converter. The power supply unit 100 may convert AC power to DC power to be output to the system unit 200 in the standby mode as standby power.

As illustrated in FIG. 2, the power supply unit 100 includes a bridge rectifier unit 110 rectifying input AC power, a power control unit 120 receiving power from the bridge rectifier unit 110 and controlling output of standby power, and a first capacitor $C_B$ (also referred to as a bias capacitor) receiving power from a current source 121 in the power control unit 120 to be charged with predetermined voltage V_bias (also referred to a bias voltage).

The power control unit 120 may be configured as an IC, that is, a power control IC, of a single chip. The power control unit 120 includes the current source 121 receiving high-voltage (HV) power from the bridge rectifier unit 110 to output a preset level of current, a first switching unit 122 turned on/off based on a signal input from the outside, and a pulse width modulation (PWM) generation unit 123 generating a PWM signal. The current source 121 may be configured as a micro current source providing a low level of current in micro-ampere (μA). The first switching unit 122 may be configured as a wake-up switch (S/W) turned on/off corresponding to an external on/off signal input from outside, for example, the power supply unit 100.

Referring to FIG. 2, the power supply unit 100 includes a second switching unit 130 receiving output power of the power control unit 120 to operate, a conversion unit 140 transmitting power supplied from the second switching unit 130 to a secondary terminal thereof, an output unit 150 rectifying the power transmitted to the secondary terminal of the conversion unit 140 to output DC power, and a feedback unit 160 receiving the output DC power back to be fed back to a feedback terminal 171 of the power control unit 120. The DC power output from the output unit 150 is standby power that is output to the system unit 200 in the standby mode.

The conversion unit 140 may be configured as a transformer including first and second coils, while the second switching unit 130 may be configured as a switching element, such as a metal-oxide semiconductor field-effect-transistor (MOFET). The output unit 150 includes a rectifier 151 and an electrolytic capacitor 152.

When the system unit 200 of the electronic apparatus 2000 is in the standby mode, the first switching unit 122 is turned off, thus not supplying power to the PWM generation unit 123.

Referring to FIG. 3, AC power applied in the standby mode is rectified by the bridge rectifier unit 110 into DC power, which is then input to the current source 121 of the power control unit 120, and the current source 121 charges the first capacitor $C_B$ provided outside the power control unit 120 with bias voltage V_bias. The power control unit 120 operates in shutdown mode in which power is supplied only to the current source 121. Accordingly, a low level of current in micro-amperes, that is, a predetermined μA current, flows in the power control unit 120, thus enabling standby power consumed in the standby mode to be maintained close to zero watts (W) less than 0.005 W without use of a mechanical (physical) switch.

The power supply unit 310 may be configured to maintain the electrolytic capacitor 152 to be charged with predetermined voltage so as to supply preset standby voltage, for example, 3.3 V or 5V, to the system unit 200 when the electronic apparatus 3000 is in the standby mode. The electrolytic capacitor 152 may be configured as a super capacitor, thereby stably supplying standby power to the system unit 200.

The first switching unit 122 may be selectively switched on/off corresponding to an external input signal. The external input signal includes on and off signals.

The external input signal may be input from the system unit 200. That is, when it is detected that standby power is not properly input from the power supply unit 310, the system unit 200 may apply an on signal to the first switching unit 122. The external input signal may be determined as an on signal or off signal in accordance with a state of charge of the electrolytic capacitor 152. That is, sufficient standby power may not be supplied to the system unit 200 depending on the state of charge of the electrolytic capacitor 152, and the system unit 200 may detect such a state and apply the external input signal to the first switching unit 122 so that the electrolytic capacitor 152 maintains a predetermined level of charge state.

An on signal may be applied to the first switching unit 122 in accordance with relieving the system unit 200 of the standby mode. For example, when an instruction to operate the electronic apparatus is received by the user, the system unit 200 may cancel the standby mode and apply an on signal to the first switching unit 122.

The external input signal may be input through a different device (not illustrated) from the electronic apparatus. For example, when the electronic apparatus is a TV, the external input signal may be received from a remote controller separate from the TV. When the electronic apparatus is a monitor, the external input signal may be received from a computer main body. An external device may apply an on or off signal as an external signal to the first switching unit 122 depending on whether standby power of the system unit 200 is supplied normally.

The power supply unit of an exemplary embodiment detects the external input signal using bias voltage V_bias changed in the first capacitor $C_B$. When the external input signal is detected to be an on signal, the first switching unit 122 is switched on, and the power control unit 120 operates to be out of the shutdown mode. Power may also be supplied to the PWM generation unit 123 of the power control unit 120. Accordingly, the power control unit 120 wakes-up.

As the power supply unit wakes-up, the PWM generation unit 123 generates a PWM signal (PWM gate signal). The PWM signal is output to the second switching unit 130, so that a switch operation of the second switching unit 130 starts. The switch operation of the second switching unit 130 is controlled by the power control unit 120. A switching pulse output from the second switching unit 130 is output to the secondary terminal based on a preset transformation ratio of the conversion unit 140.

The output unit 150 outputs DC voltage, generated by rectifying and filtering power at the secondary terminal of the conversion unit 140, to the system unit 200. The system unit 200 receives the DC power normally.

The output DC voltage may be fed back to the feedback terminal F/D of the power control unit 120 through the feedback unit 160 and regulated by feedback control of the power control unit 120. Thus, VCC voltage and a feedback signal are supplied to the power control unit 120 to operate normally.

An exemplary power controlling process of an electronic apparatus according to an exemplary embodiment is described with reference to FIG. 4.

Figure 4:
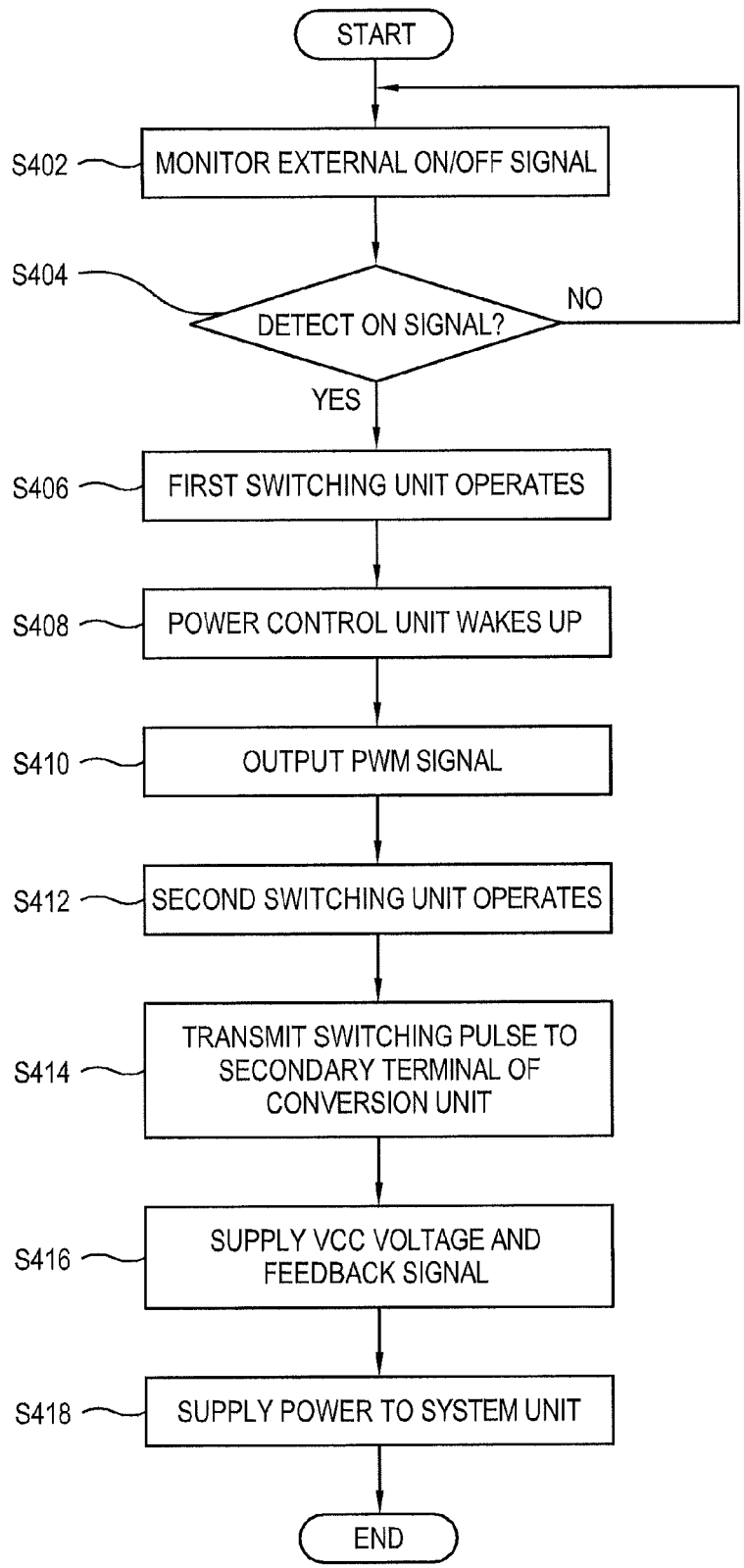
FIG. 4 illustrates a power controlling method of an electronic apparatus according to an exemplary embodiment.

FIG. 4 illustrates an exemplary power controlling method of an electronic apparatus according to an exemplary embodiment.

As illustrated in FIG. 4, a power supply unit, for example, power supply unit 100 of the electronic apparatus 1 may monitor an on/off signal input from the outside using a first switching unit 122 (S402). A switching unit, for example, first switching unit 122 monitors the external on/off signal using bias voltage V_bias chanted in the first capacitor $C_B$. The on/off signal may be input from the system unit, for example, system unit 200 or an external device.

In monitoring in operation S402, the first switching unit 122 may detect an on signal input from the outside (S404).

When the external on signal is detected in operation S404, the first switching unit 122 operates to be switched on (S406).

When the first switching unit 122 is switched on in operation S406, the power control unit 100 wakes up from the shutdown mode (S408).

Power is supplied to the PWM generation unit 123 of the power control unit 120, and the PWM generation unit 123 generates and outputs a PWM signal (S410).

The PWM signal generated in operation 5410 is output to the second switching unit Q1 130, so that the second switching unit Q1 130 operates (S412).

A switching pulse output from the second switching unit Q1 130 is transmitted to the secondary terminal of the conversion unit 140 based on a preset transformation ratio (S414).

VCC voltage and a feedback signal are supplied to the power control unit 120, so that the power control unit 120 operates normally (S416).

The signal transmitted to the secondary terminal of the conversion unit 140 in operation S414 is rectified by the output unit 150 into DC power, which is then supplied to the system unit 200 (S418).

According to an exemplary embodiment, the first switching unit 144 is provided in the power control unit 120 generating a PWM signal supplied to the system unit 200 in the standby mode to selectively supply power to the PWM generation unit 123, thereby maintaining standby power consumed in the standby mode close to zero watts. Therefore, power consumption of the electronic apparatus in the standby mode is minimized. Thus, conformance to power regulations in accordance with an energy saving policy is facilitated.

Although a few exemplary embodiments have been illustrated and described, it will be appreciated by those skilled in the art that changes may be made in these exemplary embodiments without departing from the principles and spirit of the invention, the scope of which is defined in the appended claims and their equivalents.

What is claimed is:
1. An electronic apparatus comprising:
a system unit supplied with power to conduct an operation; and
a power supply unit comprising a power control unit controlling output of standby power, and supplying the standby power to the system unit in a standby mode,
wherein the power control unit comprises a pulse width modulation (PWM) generation unit generating a PWM signal and a first switching unit turned on to selectively supply power to the PWM generation unit in the standby mode and turned off so power is not supplied to the PWM generation unit in the standby mode, wherein the first switching unit is turned on in response to a detection of an external input signal, the external input signal being applied to the first switching unit when a level of the standby power output from the power supply unit is lower than a reference level, and the external input signal being applied to the first switching unit when an instruction is received to release of the system unit from the standby mode, wherein the external input signal is detected by using a state of charge of an electrolytic capacitor corresponding to the level of the standby power supplied to the system unit.

2. The electronic apparatus of claim 1, wherein the power supply unit further comprises a first capacitor charged with preset voltage, and the first switching unit detects the external input signal using the voltage charged in the first capacitor.

3. The electronic apparatus of claim 2, wherein the power control unit further comprises a current source outputting preset current to the first capacitor.

4. The electronic apparatus of claim 1, wherein the external input signal is supplied from the system unit or an external device.

5. The electronic apparatus of claim 4, wherein the external input signal is input in accordance with a state of supply of the standby power to the system unit.

6. The electronic apparatus of claim 5, wherein the level of the standby power is detected depending on a state of charge of an electrolytic capacitor comprised in an output unit outputting direct current (DC) power to the system unit so that the electrolytic capacitor maintains a predetermined level of charge state.

7. The electronic apparatus of claim 1, wherein the power supply unit further comprises a second switching unit receiving a generated PWM signal from the power control unit so the second switching unit operates.

8. The electronic apparatus of claim 7, wherein the power supply unit further comprises a conversion unit outputting the output power from the second switching unit to a secondary terminal based on a preset transformation ratio.

9. The electronic apparatus of claim 8, wherein the power supply unit further comprises an output unit outputting direct current (DC) power to the system unit by rectifying and filtering the power from the secondary terminal of the conversion unit.

10. The electronic apparatus of claim 9, wherein the power supply unit further comprises a feedback unit feeding back the DC power from the output unit to a feedback terminal of the power control unit.

11. A power controlling method of an electronic apparatus comprising a system unit supplied with power to conduct an operation and a power supply unit supplying standby power to the system unit, the method comprising:

monitoring an external input signal using a first switching unit provided in a power control unit controlling an output of the standby power in a standby mode; and waking-up the power control unit in the standby mode by turning on in response to detection of an external input signal as a result of the monitoring, wherein:

the external input signal being applied to the first switching unit upon determining a level of the standby power output from the power supply unit is lower than a reference level, and the external input signal being applied to the first switching unit upon receiving an instruction to release of the system unit from the standby mode, wherein the external input signal is detected by using a state of charge of an electrolytic capacitor corresponding to the level of the standby power supplied to the system unit.

12. The method of claim 10, wherein the power control unit further comprises a current source outputting preset current to a first capacitor of the power supply unit, and the monitoring detects the external input signal using voltage charged in the first capacitor.

13. The method of claim 11, wherein the external input signal is supplied from the system unit or an external device.

14. The method of claim 13, wherein the external input signal is input in accordance with a state of supply of the standby power to the system unit.

15. The method of claim 14, wherein the level of the standby power is detected depending on a state of charge of an electrolytic capacitor comprised in an output unit outputting direct current (DC) power to the system unit so that the electrolytic capacitor maintains a predetermined level of charge state.

16. The method of claim 11, wherein the waking up comprises supplying power to a pulse width modulation (PWM) generation unit provided in the power control unit and outputting a generated PWM signal to second switching unit so the second switching unit operates.

17. The method of claim 11, further comprising receiving the output power from the power control unit and switching the output power by a second switching unit.

18. The method of claim 17, further comprising outputting the output power from the second switching unit to a secondary terminal of a conversion unit having a preset transformation ratio.

19. The method of claim 18, further comprising outputting direct current (DC) power to the system unit by rectifying and filtering the power from the secondary terminal of the conversion unit.

20. The method of claim 19, further comprising feeding back the DC power unit to a feedback terminal of the power control unit.

* * * * *